Oct. 28, 1924.
F. T. KAELIN
1,513,250
METHOD OF GENERATING AND CONTROLLING THE GENERATION OF STEAM
Filed Jan. 31, 1922
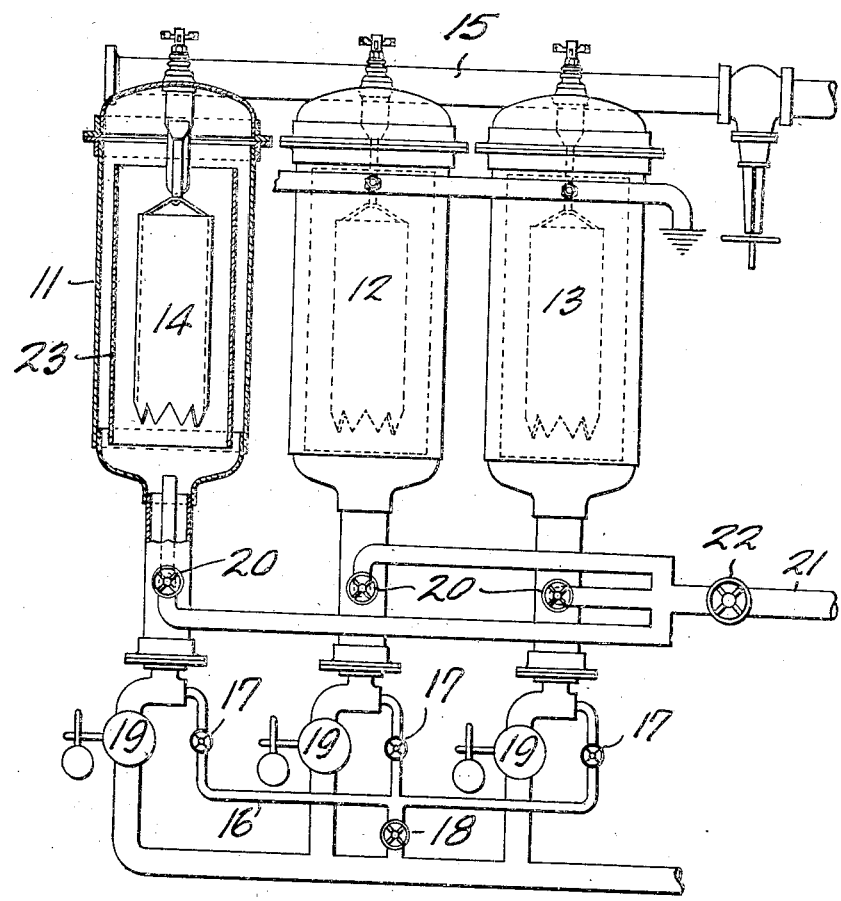
Inventor
Frederick T. Kaelin
By
Attys.

Patented Oct. 28, 1924.

1,513,250

UNITED STATES PATENT OFFICE.

FREDERICK T. KAELIN, OF MONTREAL, QUEBEC, CANADA.

METHOD OF GENERATING AND CONTROLLING THE GENERATION OF STEAM.

Application filed January 31, 1922. Serial No. 533,018.

*To all whom it may concern:*

Be it known that I, FREDERICK T. KAELIN, a subject of the King of Great Britain, and resident of the city of Montreal, in the Province of Quebec and Dominion of Canada, have invented certain new and useful Improvements in Methods of Generating and Controlling the Generation of Steam, of which the following is a full, clear, and exact description.

This invention relates to a method of generating steam by the direct action of electric current on water, and the object of the invention is to control the generation of steam.

It has been found that when an electric current is passed between terminals or electrodes immersed in water that the water acts as a resistance and is heated, steam being generated. It has been found expedient to regulate the generation of steam by regulating the submergence of the electrodes. The electrodes are sufficiently spaced apart, so that there is no discharge between them in air or in a dense atmosphere, such as steam under pressure. The discharge takes place therefore only through the water and, disregarding impurities and temperature, the resistance and therefore the current input and amount of steam generated vary according to the amount of submergence of the electrodes. As it is not convenient mechanically to raise or lower the electrodes, the regulation is effected by raising or lowering the level of water.

The weight of water which may be passed through a comparatively small vessel and converted into steam in the course of even a few hours is very considerable. It therefore follows that even minute traces of salts or the like, suspended inorganic solids or even minute animal or vegetable organisms will rapidly concentrate in a device of this character and materially alter the electric conductivity of the water. It has been assumed that the regulation of apparatus of this kind could be satisfactorily effected as regards such impurities merely by fixing the inflow of water, while allowing a certain normal uniform outflow to carry off impurities. It has also been assumed that the regulation of the apparatus to maintain steam at a constant pressure under varying load conditions could be effected merely by regulating the outflow, so as to alter the water level and therefore the active or submerged electrodes surface.

I have recently discovered that, especially with large installations, the regulation of electric conductivity of the water is quite as important if not more important than the regulation of water level to maintain a substantially constant pressure of steam, or in other words, to vary the generation of steam according to variations in the consumption, i. e., the load on the apparatus. The importance of conductivity regulation will be more readily appreciated when it is realized that, by varying the conductivity, a considerable variation may be made in the amount of steam generated with little or no variation in the water level.

This variation in electric conductivity of the water is effected by varying the outflow, but as this variation of outflow is not necessarily accompanied by a variation of water level but is accompanied by a variation in the generation of steam, it may be said that the invention resides in regulating the conductivity of the water.

For a more perfect understanding of the invention, reference may be had to the accompanying drawing which illustrates more or less diagrammatically one form of apparatus suitable for carrying out the present invention.

In this drawing 11, 12 and 13 designate three vessels, each containing an electrode 14, which may be connected severally to the three phases of a three-phase circuit. The three vessels are connected at the top by a steam header 15 and are each connected at the bottom to a discharge pipe 16, through individual valves 17 for the several vessels. The discharge from the pipe 16 may be regulated by a valve 18, which will thus regulate the discharge of all vessels simultaneously. Each of the vessels may also be provided with adjustably loaded automatic relief valves 19. Each vessel has its individual water inlet control 20 connecting with a water main 21 through a valve 22, which serves to adjust the flow to all three vessels. Each vessel may in addition have a ground electrode 23 surrounding the electrode 14, for the purpose of protecting the shell from damage by reason of current flow.

Under working conditions, the supply of water is adjusted to be slightly in excess of the weight of steam to be delivered. The inflow of water is preferably at a uniform rate of so many pounds per second and normally an outflow of a lesser number of pounds per second leaves a difference, which represents the weight of steam generated per second under theoretical or ideal conditions. Under practical conditions, the weight of steam generated per unit of time is a condition subordinate to the maintenance of a pressure and, to maintain any given pressure under fluctuating load conditions, the weight of steam generated per second must vary from time to time. It was originally supposed that by checking the discharge of water, so that a rise in level resulted, an increased amount of steam would be generated due to the increased submergence of the electrodes and the consequent increased power input. Undoubtedly an increase in submergence of the electrodes will produce an increased evolution of steam but it has now been found that the checking of the discharge does not necessarily raise the level and increase the submergence but does, nevertheless, effect a material increase in the steam production. This is due to the fact that the decreased discharge retains in the vessel a larger amount of more highly conductive or contaminated water. This lowering of the resistance of the water results in a bigger current flow and greater heating effect, so that more steam is generated. The increase in generation of steam uses up the additional amount of retained water, so that the level may remain stationary or may even drop.

When there is a reduction in the amount of steam taken, the pressure would tend to rise and to compensate for this the discharge of water is increased. The first effect of the increased discharge is to let out the highly conductive or low resistance water, which is replaced by fresh water of less conductivity. As a result, less current flows and less heating effect is obtained, so that the generation of steam is decreased and the pressure drops as desired. This is not necessarily accomplished by any lowering of the water level. Obviously, very large variations in pressure cannot be compensated for by variation of the conductivity, nor is it desirable that they should be. The ordinary minute to minute or hour to hour regulation may be effected by varying the conductivity of the water and without producing anything like the variation in discharge that would be necessary if reliance was placed entirely upon regulation by means of varying the water level.

Regulation by varying the water level to be effective presupposes a constant electric conductivity and this uniform conductivity can be obtained only by relatively large discharges of water. As such large discharges carry off a considerable amount of heat, they are not desirable. Reduction in the amount of discharge proportional to the supply is accompanied by a concentration of impurities and therefore by an increase in value of the conductivity factor. If it is attempted to operate an apparatus in which the discharge has been reduced to a very small fraction of the supply merely by regulation of the water level, unsatisfactory results will be obtained. When an increase of steam generation is desired, the water level would be raised but, instead of an immediately responsive increase, the generation would remain stationary or perhaps even drop, owing to the lowered conductivity of the water resulting from the removal of highly conductive water or its dilution in less conductive water. The result is that, when regulating by water level only, the levels must be changed more than is really necessary. In fact, in actual practice, when an automatic pressure controlled valve was used to regulate the water level, a very noticeable and highly undesirable surging of water resulted. When, however, the water level was disregarded and attention directed to regulating the conductivity, the surging entirely disappeared, changes of level were gradual, and pressure was maintained nearly constant with very little variation of the discharge. It may also be stated that within limits the generation of steam and the power input have no relation to the water level. In other words, the level may be increased or decreased without affecting the generation of steam or the power input as long as the conductivity of the water is altered at the same rate that the level is changed. Conversely, the amount of steam generated and the power input may be increased or decreased without altering the water level if the conductivity of the water is altered at substantially the same rate as the increase or decrease.

In practice, it is preferred to regulate the conductivity merely by regulating the discharge and not by altering the supply. It will be understood, however, that the supply may be altered either by regulating the inflow of fresh water or by introducing bodies in solution or suspension which will alter the conductivity of the water in the vessel. For example, a few grams of sodium bicarbonate introduced into say one hundred gallons of water will make a very marked alteration in the electric conductivity or resistance of the water.

In the operation of a device such as illustrated, the regulation is preferably effected for all vessels of the apparatus by the valve 18 and minor regulations to compensate for peculiarities of the various vessels are effected by the valves 17. By means of the valves 17, the different vessels may be made to do approximately equal portions of the work, while the regulation of the whole system to maintain the pressure and to meet changes in the consumption of steam will be made by the valve 18. The total flow of water to the apparatus will be fixed by the valve 22 and the division of this water between the units of the apparatus according to their several needs and capacities will be effected by the valves 20. In the event of accident or neglect, the valves 19 will operate automatically or may be operated by hand when a rapid discharge is desired.

It will be understood that while one particular form of apparatus has been disclosed, the invention is not limited to use with this form but applies to any type of apparatus which depends upon the utilization of water as an electric resistance.

Having thus described my invention, what I claim is;—

1. A method of generating steam at constant pressure which consists in passing an electric current between electrodes submerged in water in a closed vessel, and regulating the electric conductivity of the water.

2. A method of generating steam, which comprises passing an electric current between electrodes submerged in water in a closed vessel, admitting to the vessel an amount of water in excess of the weight of steam desired, discharging the excess water, and regulating the electric conductivity of the water to regulate the generation of steam by varying the rate of water discharge.

3. A method of generating steam at constant pressure which comprises passing an electric current between electrodes submerged in water in a closed vessel, admitting at a substantially regular rate a weight of water in excess of the weight of steam required, discharging the excess of water and varying the electric conductivity of the water as necessary to maintain a uniform pressure of steam by regulating the rate of discharge of the excess water.

4. In the generation of steam by passing an electric current between electrodes submerged in water, the step of regulating the relative amounts of fresh water admitted and impure water discharged to govern electric conductivity of the water and the generation of steam.

5. A process according to claim 4, in which the regulation is effected admitting fresh water at a constant rate in excess of the requirements and varying the rate of emission of the excess water according to the impurities therein and their effect on the resistance.

In witness whereof, I have hereunto set my hand.

FREDERICK T. KAELIN.